United States Patent [19]

Hatten

[11] 4,193,390

[45] Mar. 18, 1980

[54] SOLAR HEATING SYSTEM

[76] Inventor: Maurice E. Hatten, 1482 Ashland Ave., Columbus, Ohio 43212

[21] Appl. No.: 882,409

[22] Filed: Mar. 1, 1978

[51] Int. Cl.² ............................................. F24J 3/02
[52] U.S. Cl. ............................................. 126/429
[58] Field of Search ............... 126/270, 271; 237/1 A; 98/33 A; 165/48, 49

[56] References Cited

U.S. PATENT DOCUMENTS

| | | | |
|---|---|---|---|
| 2,559,869 | 7/1951 | Gay | 237/1 A |
| 3,841,302 | 10/1974 | Falbel | 126/270 |
| 3,902,474 | 9/1975 | Pyle | 237/1 A |
| 4,015,585 | 4/1977 | Fattor | 237/1 A |
| 4,073,284 | 2/1978 | Laing | 126/271 |
| 4,103,825 | 8/1978 | Zornig | 237/1 A |
| 4,128,124 | 12/1978 | Worthington | 126/270 |

FOREIGN PATENT DOCUMENTS 2267531 11/1975 France ................................. 126/270

*Primary Examiner*—James C. Yeung

[57] ABSTRACT

A solar heating system for a building that utilizes a duct arrangement for heated air, wherein the ducts are located, so as to induce flow of the heated air through the system.

9 Claims, 1 Drawing Figure

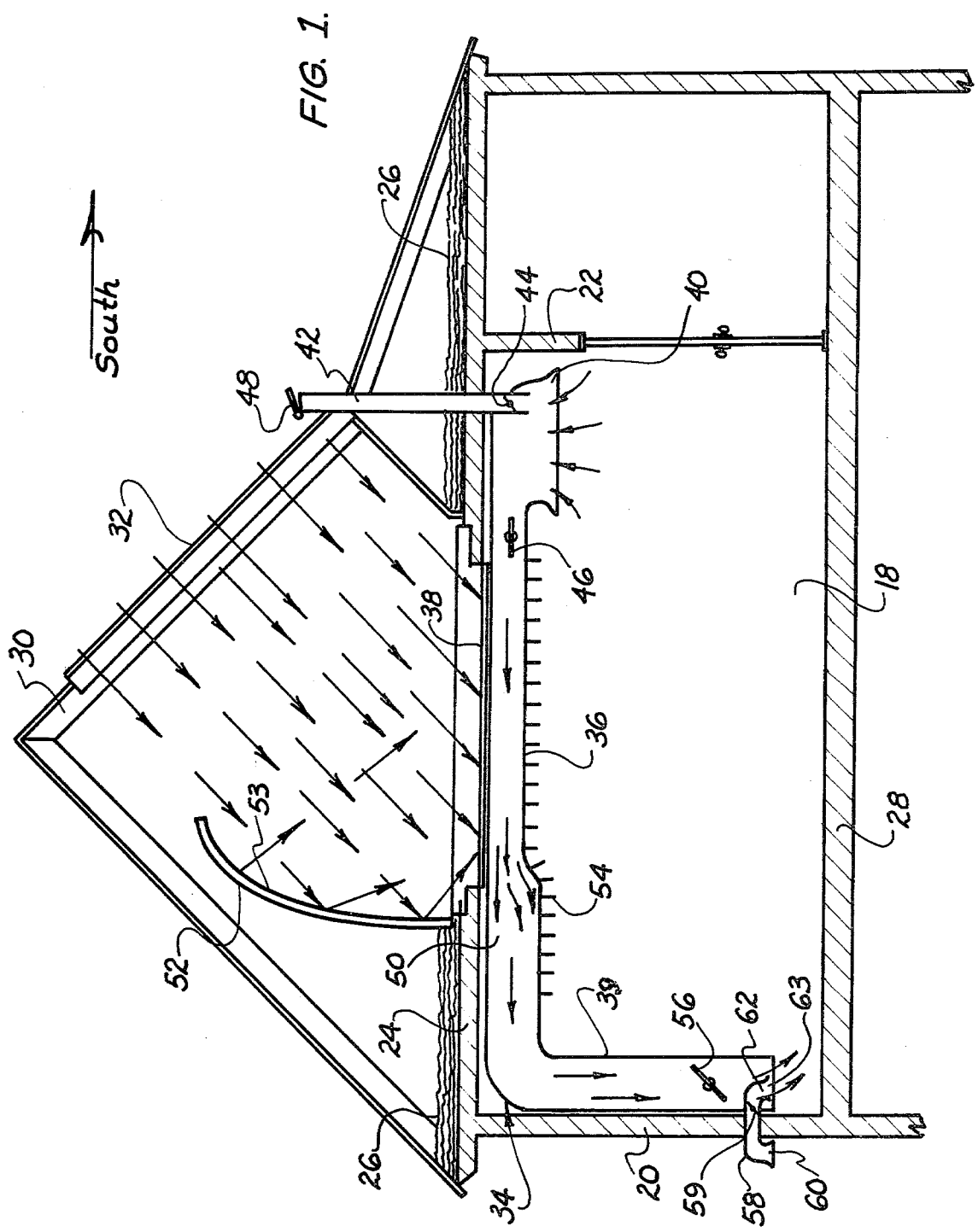

SOLAR HEATING SYSTEM

BACKGROUND OF THE INVENTION

The present invention relates a solar heating system for buildings, and more particularly to such a system, wherein a simple duct arrangement is utilized to collect solar heat and transfer it to the heated zone.

In general solar heating systems are well known, but most prior systems have presented a problem, in that they are relatively complex and hence expensive, so as to preclude general use. Such prior systems have in many instances included relatively expensive heat storing magazines, relatively complex heat absorbing panels, and have required costly power means for producing air flow through the system.

SUMMARY OF THE INVENTION

In general, the present invention comprises a simple duct means, wherein a plurality of duct sections are located with respect to a colder outside wall and a warmer interior zone of the building, so as to induce a flow of heated air responsive to a differential in the density of air in different sections of the duct means.

As another aspect of the invention, the novel duct means is uniquely arranged to function as a simple engine for producing a flow of air through the duct means as well as the heated zone without the need of electricity or fuel.

As another aspect of the invention, the novel duct means comprises heat absorbing duct portion that utilizes an upper duct wall section as a heat absorbing panel for the inpingement of light rays from the environment.

As another aspect of the present invention, the novel duct means comprises a horizontally disposed heat transfer duct portion that includes a lower wall section, provided with heat transfer fins for supplementing the heating effect by direct radiation to the warmer zone being treated.

As another aspect of the present invention, the novel duct means comprises an airflow expansion plenum located down stream from the heat absorbing duct wall section for cooling the flow at the above mentioned heat transfer fins and for augmenting the flow through the duct means.

As another aspect of the present invention, the novel system includes a light reflector, mounted between the heat transfer duct portion and the roof of the building with such light reflector being oriented to reflect ambient light rays into impinging relationship with the heat absorbing duct wall section. Or a series of reflectors may be used.

As still another aspect of the present invention, the novel duct means is provided with a draft stack for augmenting the airflow through the system.

As still another aspect of the present invention, the novel duct means comprises a make-up air inlet conduit connecting the duct system with the environment so as to provide a controlled amount of fresh air for the zone being heated, as well as to augment operation of the above mentioned draft stack.

As still another aspect of the present invention, the novel duct means is provided with an inwardly convergent duct entrance for increasing the effiency of the air pick-up from the heated zone.

Further objects and advantages of the present invention will be apparent from the following description, reference being had to the accompanying drawing wherein preferred form of embodiment of the invention is clearly shown.

BRIEF DESCRIPTION OF THE DRAWINGS

The single FIGURE of the drawings is a sectional view of a typical building, showing the solar heating system of the present invention installed therein, the section being taken along a vertical plane through the building and system.

DESCRIPTION OF A PREFERRED EMBODIMENT

Referring in detail to the drawing, the typical building illustrated in cross section includes a colder outside wall 20, exposed to the environment, a warmer interior wall 22, a ceiling 24, and a floor 28. These walls define a warmer zone to be heated which zone is relatively warm as compared to the colder outside wall 20.

A single duct means is indicated generally at 34 and comprises a horizontally extending heat transfer duct portion 36 with a vertically extending duct portion 39 forming a continuation of duct portion 36. It should be noted that vertically extending duct portion 39 is located in heat transfer relationship with colder outside wall 20, whereby the vertical duct portion is maintained relatively cold with respect to air entering the duct at 40.

Referring particularly to horizontally extending duct portion 36; the upper wall of such duct is provided with heat absorbing duct wall section 38 which receives incident light rays via a light admitting window 32, mounted in a roof 30, such that incident solar rays impinge upon heat absorbing duct wall section 38.

It should be mentioned that duct wall section 38 can be formed as a continuous portion of the upper duct wall which is finished flat black, or if desired can be formed as a separate panel, fitted into a cut-out section of the upper duct wall.

As a preferred embodiment the system is provided with a solar ray reflector 52 mounted in the space between roof 30 and ceiling 24, with the reflecting surface 53 of the reflector being parabolic in configuration, so as to converge solar rays into focused impingement with heat absorbing duct wall section 38.

It should be mentioned that ceiling 24 is provided with insulation 26 with the exception of the cut-out at the heat absorbing duct wall section 38.

Referring again to the horizontal heat transfer duct portion 36, the entrance 40 thereof is shaped so as to be convergent inwardly to increase the efficiency of air entry, and a draft stack 42 is mounted with its inlet positioned in duct entrance 40, and with its outlet positioned above the roof. A draft control damper 44 is provided adjacent the inlet and a back-flow check valve 48 is shown mounted at the outlet.

With continued reference to the horizontal duct portion 36, an expansion plenum 50 is provided down stream of heat absorbing wall section 38, so as to provide an expansion and cooling of the heated airflow, as well as a reduction of the velocity head of the air flow as it enters vertical duct portion 39. Also a plurality of spaced fins 54 are provided at expansion plenum 50 for the purpose of radiating heat from the plenum to the heated zone 18.

Referring particularly to vertical duct portion 62, a make-up air conduit is extended through colder outside wall 20 and includes a conduit outlet 62 positioned within duct outlet 63. Such make-up air supply from the environment functions to provide fresh air to zone 18, as well as to augment the flow inducing action of draft stack 42. A flow control valve 59 is mounted in make-up air conduit 58 for controlling the admission of outside air and can be regulated, as required by the fresh air requirement and draft setting of draft control damper 44.

It should also be mentioned that a volumetric flow conroller 46 is provided in horizontal duct portion 36, so as to selectively control the entrance flow to the duct means, and a second controller 56 is provided in the vertical duct portion near the outlet thereof. Such later controller 56 provides means for controlling local convection or back draft, and can be in the form of a counterbalanced flow actuated check valve.

It should be mentioned that the position of inlet 60 of make-up air conduit 50 should be raised vertically, as compared to the location illustrated, in climates where snow-falls are encountered. This can be done by using a relatively long conduit section along the outer surface of colder wall 20, so as to preclude any possibility of clogging of conduit 58 by snow.

It should be further mentioned that the light admitting window 32 is preferably covered at night during the heating season by means of a draw curtain or louvered blind, so as to prevent the loss of heat radiation to the environment. Alternatively or in addition, reflector 52 could be pivot mounted and lowered over the heat absorbing duct wall 38 at night to lessen heat loss.

What is claimed is:

1. A natural convection solar heating system for a building of the type that includes a colder outside wall, a warmer interior zone, a ceiling for said zone, and a light admitting window, in spaced overlying relationship with said ceiling, said heating system comprising, in combination, an airflow duct means extended along said ceiling and including a horizontally extending heat transfer duct portion provided with a top heat absorbing duct wall exposed to said light admitting window, an expension plenum downstream of said heat absorbing duct wall, a duct inlet communicating with said warmer interior zone for receiving an air-flow therefrom, a downwardly extending duct portion positioned adjacent said colder outside wall and forming a continuation of said heat transfer duct portion, and a duct outlet located at a substantial distance below said duct inlet for delivering the airflow to said zone.

2. The solar heating system defined in claim 1, wherein said duct inlet includes a vertically disposed draft stack comprising a stack inlet positioned in said duct inlet and a stack outlet located outside the interior zone.

3. The solar heating system defined in claim 1 wherein said duct inlet includes an inwardly convergent entrance.

4. The solar heating system defined in claim 1, wherein said horizontally extending heat transfer duct portion includes an airflow damper between said inlet and said heat absorbing duct wall.

5. The solar heating system defined in claim 1, wherein said horizontally extending heat transfer duct portion includes a bottom duct wall provided with spaced fins disposed in said zone.

6. The solar heating system defined in claim 1, wherein a light reflector is mounted between the ceiling and the light admitting window and oriented to reflect ambient rays from said window into impinging relationship with the heat absorbing duct wall.

7. The system defined in claim 6, wherein said light reflector is of generally parabolic configuration and oriented to focus light rays on the heat absorbing duct wall.

8. The solar heating system defined in claim 1, wherein the downwardly extending duct section includes a damper for controlling back-draft convection.

9. The solar heating system defined in claim 1, that includes a make-up air inlet conduit extended through said colder outside wall adjacent said duct outlet.

* * * * *